United States Patent
Weaver et al.

(10) Patent No.: US 9,697,173 B2
(45) Date of Patent: Jul. 4, 2017

(54) DNS PROXY SERVICE FOR MULTI-CORE PLATFORMS

(75) Inventors: David John Weaver, Fishers, IN (US); Keith Robert Broerman, Carmel, IN (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 1000 days.

(21) Appl. No.: 13/991,630

(22) PCT Filed: Dec. 21, 2010

(86) PCT No.: PCT/US2010/003228
§ 371 (c)(1),
(2), (4) Date: Jun. 5, 2013

(87) PCT Pub. No.: WO2012/087262
PCT Pub. Date: Jun. 28, 2012

(65) Prior Publication Data
US 2013/0262637 A1   Oct. 3, 2013

(51) Int. Cl.
*H04L 29/12* (2006.01)
*G06F 15/177* (2006.01)

(52) U.S. Cl.
CPC ...... *G06F 15/177* (2013.01); *H04L 29/12066* (2013.01); *H04L 29/1282* (2013.01);
(Continued)

(58) Field of Classification Search
CPC .................... G06F 15/177; H04L 29/12066
(Continued)

(56) References Cited

U.S. PATENT DOCUMENTS 8,612,592 B2* 12/2013 Wing ................ H04L 29/12066
                                                    709/219
8,626,950 B1*  1/2014 MacCarthaigh .... H04L 61/1511
                                                    709/223
(Continued)

FOREIGN PATENT DOCUMENTS

JP         9275413       10/1997
JP       2005142702       6/2005
(Continued)

*Primary Examiner* — Arvin Eskandarnia
(74) *Attorney, Agent, or Firm* — Chris Kolefas; Jerome G. Schaefer

(57) ABSTRACT

In a multi-core platform in which secondary processing cores do not have direct WAN connectivity, methods and apparatus are described that enable the secondary processing cores to provide DNS resolution services to their network applications and/or client devices attached thereto. In an exemplary embodiment, a primary processing core having direct WAN connectivity and a DHCP client includes a DNS proxy service module which acts as a DNS server to the platform's secondary processing cores. Each secondary processing core sends DNS queries to the primary core DNS proxy service module. A primary core DNS resolver regenerates DNS queries based on the DNS queries from the secondary cores and forwards them for resolution to WAN-side DNS servers whose IP addresses were provided to the DHCP client in response to an IP lease request. The resolved IP addresses are returned by the WAN-side DNS servers to the primary processing core, which provides them to the requesting secondary core applications or client devices, via the DNS proxy service module.

15 Claims, 4 Drawing Sheets

(52) U.S. Cl.
CPC ...... *H04L 61/1511* (2013.01); *H04L 61/6013* (2013.01); *H04L 29/12226* (2013.01); *H04L 61/2015* (2013.01)

(58) Field of Classification Search
USPC .......................................................... 709/220
See application file for complete search history.

(56) References Cited

U.S. PATENT DOCUMENTS

2010/0077462 A1\* 3/2010 Joffe .................... H04L 63/126
726/5
2010/0262650 A1 10/2010 Chauhan et al.

FOREIGN PATENT DOCUMENTS

| JP | 2006074594 | 3/2006 |
| JP | 2009265843 | 11/2009 |
| WO | WO0205510 | 1/2002 |
| WO | WO2010042733 | 4/2010 |

\* cited by examiner

DNS PROXY SERVICE FOR MULTI-CORE PLATFORMS

This application claims the benefit, under 35 U.S.C. §365 of International Application PCT/US2010/003228 filed Dec. 21, 2010 which was published in accordance with PCT Article 21(2) on Jun. 28, 2012 in English.

FIELD OF THE INVENTION

The present invention generally relates to data communications, particularly to data communications over a network involving a platform with multiple processing cores.

BACKGROUND OF THE INVENTION

In a multi-core platform, such as an advanced cable gateway, one of the multiple processing cores, the "primary core," typically will have wide area network (WAN) connectivity and will implement a Dynamic Host Configuration Protocol (DHCP) client to obtain a globally routable Internet Protocol (IP) address from a remote DHCP server. The DHCP server will respond to an IP lease request from the DHCP client with a DHCP offer message that will typically contain a list of IP addresses of Domain Name System (DNS) servers that the client can use for resolving domain names (e.g., "www.technicolor.com" is resolved as IP address 157.254.235.97).

The other processing cores ("secondary cores") in such a multi-core platform may host their own operating systems with network applications (e.g., HTTP browser, stock ticker, etc.) that also require DNS resolution services. Additionally, any number of client devices such as computers, game systems, or the like, may be attached to and dependent on one or more secondary processing cores for access to the internet. Typically, these secondary cores do not have direct WAN connectivity but instead may use Internet Engineering Task Force (IETF) Class A, B, or C private networks (either physical or virtual) to communicate with the primary core and with each other. For simplicity, secondary core network interfaces typically use fixed Class A, B, or C private network addresses (e.g., 192.168.0.xxx) and do not implement local DHCP clients to obtain private IP addresses from the primary core. A limitation of using fixed private network addresses, however, is that the secondary cores cannot directly provide DNS resolver services to the network applications running on those cores and/or client devices attached thereto.

One approach to this problem is for the primary core to host a private DHCP server to serve private IP addresses to each secondary core. The private DHCP server could pass to the secondary cores, in private DHCP offers, the DNS server IP list acquired from the WAN-side DHCP server. This approach also requires each secondary core to implement a DHCP client. More limiting however, the primary core DHCP server must be able to support multiple DHCP scopes in order to allocate a known fixed IP address to each secondary core, based on, for example, the network interface identifiers—such as the Media Access Control (MAC) addresses—of the secondary cores. A drawback of this approach is that multiple-scope DHCP server capability adds significant product complexity, and as mentioned, it also requires each secondary core to implement a DHCP client, adding further complexity to the multi-core platform.

A need exists, therefore, for an arrangement without the aforementioned shortcomings that allows a multi-core platform to provide DNS resolution services to network applications running on secondary cores, and/or clients of secondary cores, with no direct WAN connectivity.

SUMMARY OF THE INVENTION

Methods and apparatus are disclosed for use in a multi-core platform allowing DNS resolution services to be provided to network applications running on secondary processing cores, and/or clients of secondary processing cores, with no direct WAN connectivity. In an exemplary embodiment, a primary processing core having direct WAN connectivity implements a DNS proxy service using DNS information provided by a WAN-side DHCP server. A DNS proxy service module on the primary processing core accepts DNS queries from the secondary processing cores as if it were a full DNS server itself. The DNS queries are then reformulated by a primary core DNS resolver and sent to WAN-side DNS server(s) for resolution. The resultant IP addresses are returned to the primary processing core which uses the DNS proxy service module to distribute the IP addresses to the requesting secondary core applications and/or attached clients.

Additionally, in exemplary embodiments, the primary core DNS service can be updated on the fly, such as by a service provider, through a renewal of the primary core IP lease initiated by the service provider's DHCP server. Because the primary core acts as a central repository for the DNS service, the secondary cores need not take any action for the new information to be utilized. Moreover, even if the primary core does not have full WAN connectivity with an actual WAN-side DNS server, the secondary cores will be able to send DNS queries to the primary core DNS proxy service without waiting for the WAN connectivity.

In view of the above, and as will be apparent from the detailed description, other embodiments and features are also possible and fall within the principles of the invention.

BRIEF DESCRIPTION OF THE DRAWINGS

Some embodiments of apparatus and/or methods in accordance with embodiments of the present invention are now described, by way of example only, and with reference to the accompanying figures in which.

DETAILED DESCRIPTION

Figure 1:
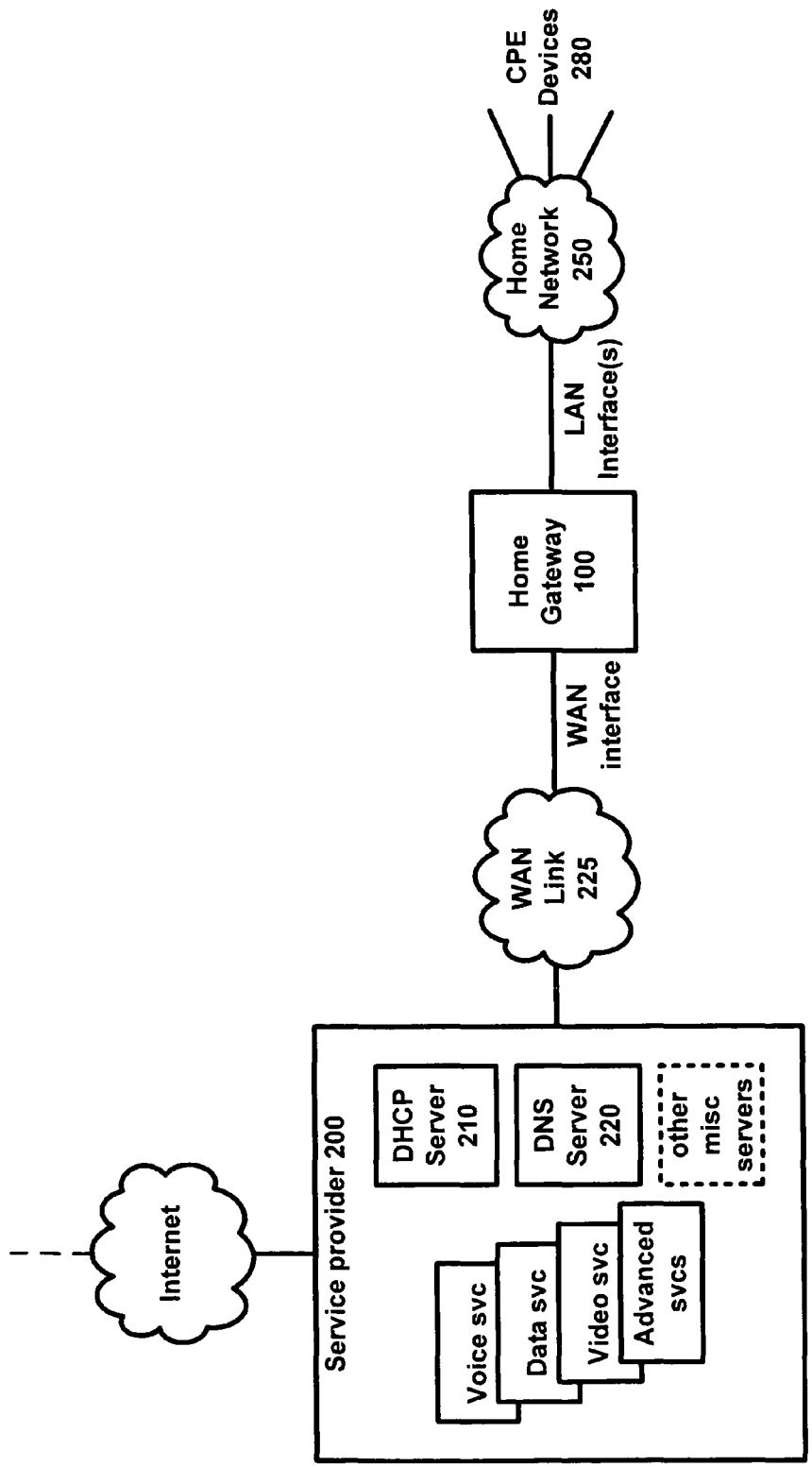
FIG. 1 is a block diagram showing the arrangement of an exemplary multi-core home gateway between a WAN link, such as with a service provider, and a LAN, such as a home network.

FIG. 1 is a block diagram of a typical arrangement including an exemplary home gateway 100. It is contemplated that home gateway 100 is a multi-core platform, such as an advanced cable gateway or the like. The home gateway 100 is coupled via a wide area network (WAN) link 225 such as, for example, cable, fiber, or DSL to service provider 200. Home gateway 100 is also coupled via a local area network (LAN), such as home network 250 to one or more customer premises equipment (CPE) devices 280. CPE devices 280 may include, for example, personal computers, network printers, digital set-top boxes, and/or audio/visual media servers and players, among others.

Service provider 200 provides one or more services such as voice, data, video and/or various advanced services over WAN link 225 to CPE devices 280. Service provider 200 also includes DHCP server 210 and DNS server 220, and may include other servers as well. As can be appreciated, service provider 200 may have multiple DHCP, DNS and other servers, which can be co-located or widely distributed. It is contemplated that service provider 200 operates in a conventional manner in accordance with well known protocols. In an illustrative cable application, service provider 200 may be, for example, a multiple service operator (MSO).

Figure 2:
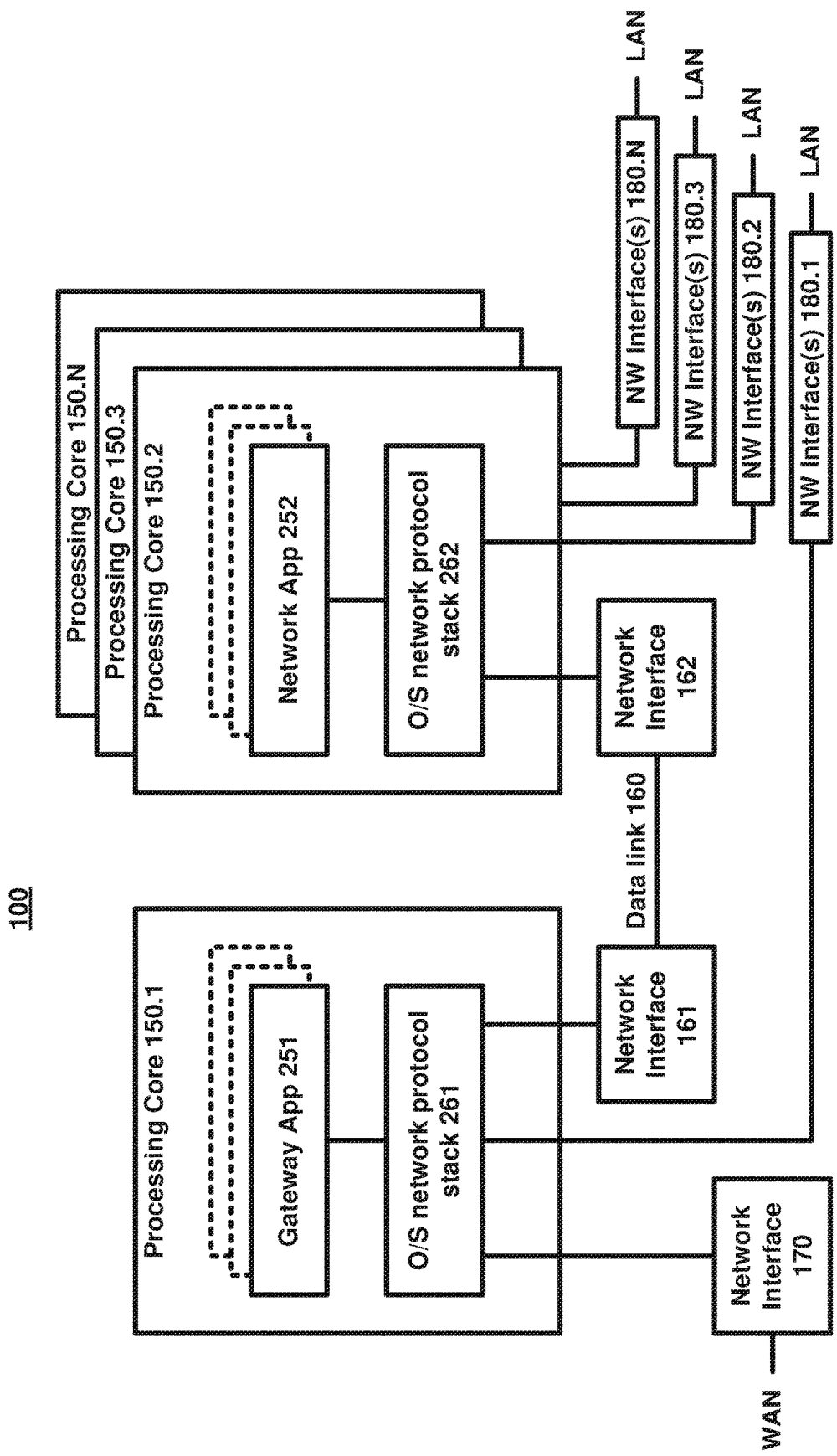
FIG. 2 is a block diagram of an exemplary embodiment of a home gateway system having multiple processing cores that intercommunicate using a physical or virtual communication data link.

FIG. 2 is a block diagram of an exemplary embodiment of home gateway 100 having multiple processing cores 150.1-150.N (collectively referred to as 150). Processing cores 150 of home gateway 100 may be processing cores of one or more integrated multi-core processors, individual processors, or a combination thereof. Regardless of the particular implementation, it is contemplated that each processing core 150 operates independently of other processing cores 150 and is typically able to read and execute its own instructions in parallel to other processing cores 150. Moreover, each processing core 150 may host its own operating system (O/S) and is able to run multiple applications that use operating system resources. It is contemplated that processing cores 150 execute various applications for providing services to CPE devices 280 and for managing the home gateway 100, among other possibilities.

Processing cores 150 intercommunicate using a data link 160 via respective network interfaces 161, 162. Data link 160 can be implemented as a virtual communication link between virtual network interfaces 161, 162 or as a physical communication link between physical network interfaces 161, 162. Exemplary virtual data link implementations include, for example, an inter-process communication (IPC) data link, with shared memory and/or interrupts, among other possibilities. Exemplary physical data link implementations include, for example, serial or parallel data links, among other possibilities.

In the exemplary embodiment shown, one of the processing cores 150.1 acts as a "primary" core, whereas the remainder of the processing cores 150.2-150.N act as "secondary" cores. Primary processing core 150.1 has access to WAN link 225 via network interface 170, whereas secondary processing cores 150.2-150.N typically do not. Network interface 170 is typically a physical interface, such as DOCSIS, Ethernet, or MoCA, among other possibilities. Home gateway 100 also has one or more network interfaces 180.1-180.N (collectively 180) for access to a LAN or the like (e.g., home network 250). One or more processing cores 150 can use network interface(s) 180 to communicate with CPE devices 280 on home network 250. Each network interface 180 is also typically a physical interface, such as Ethernet, USB, MoCA, or WiFi, among other possibilities.

In an illustrative application such as an advanced cable gateway, primary processing core 150.1 implements a gateway application 251, among others. Gateway application 251 handles various functions including, for example: management of the WAN and LAN interfaces; packet routing or bridging between the WAN and LAN interfaces; and gateway hardware management including power and/or low power modes, status indicators, and the like. In addition, gateway application 251 also provides DHCP and DNS functions, as described in greater detail below. Each of the secondary processing cores 150.2-150.N implements one or more network applications 252 requiring DNS resolution services, such as web browsers or the like. Network applications 252 running on the processing cores may include, for example, web browsers, stock tickers, UPnP media servers/players, file servers, music clients/servers, and game servers, among others. Primary processing core 150.1 may also implement applications requiring DNS resolution services. As can be appreciated, processing cores 150 will also typically implement applications that do not require DNS resolution services.

As shown in FIG. 2, the various network applications running on the processing cores 150, including gateway application 251 on primary processing core 150.1, each sit on top of a network protocol stack 261, 262 (provided by the operating system of each core) for communicating with each other and with the WAN and LAN network interfaces 170, 180. It is contemplated that any of a variety of suitable operating systems with network capabilities and network protocol stacks can be used.

Figure 3:
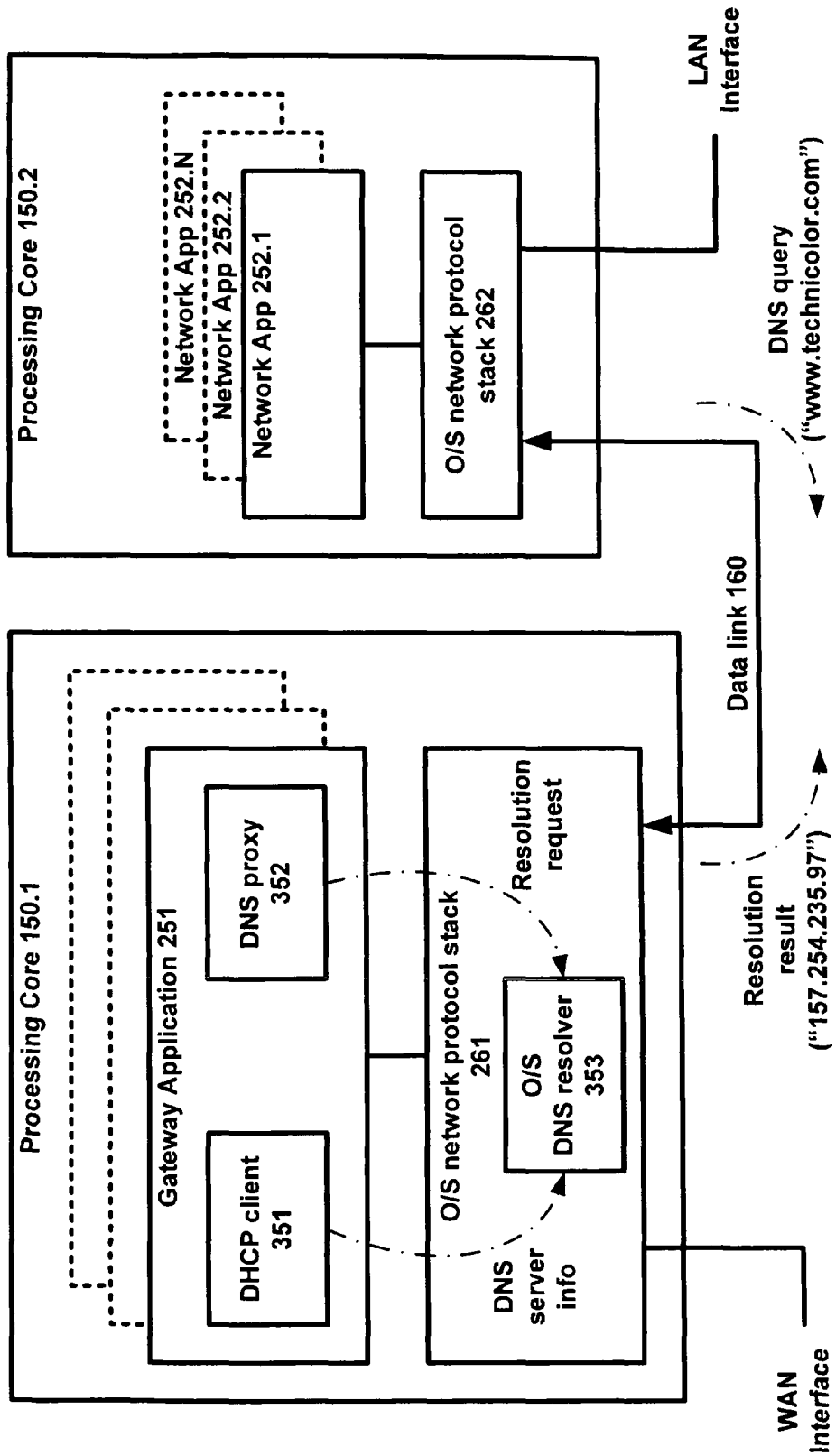
FIG. 3 is a block diagram of an exemplary embodiment of a home gateway system including a primary processing core implementing a DHCP client and a DNS proxy service module which acts as a DNS server for network applications running on the secondary core and/or client devices attached thereto.

FIG. 3 shows in greater detail the implementation of DHCP and DNS functions on the processing cores 150. For simplicity, only one secondary processing core 150.2 is depicted in FIG. 3. As shown in FIG. 3, gateway application 251 implemented on primary processing core 150.1 includes a DHCP client 351 and a DNS proxy service module 352. In addition, it is contemplated that the operating system of primary processing core 150.1 has a DNS resolver 353 as part of its network protocol stack 261. In accordance with conventional operation, DHCP client 351 sends IP lease requests, via O/S network protocol stack 261, to a WAN-side DHCP server, such as DHCP server 210 of service provider 200 (FIG. 1), which, in turn, responds with DHCP offer messages. Each DHCP offer message contains a list of IP addresses of DNS servers (such as DNS server 220) that can be used for resolving host domain names.

Generally, DHCP client 351 provides the DNS server IP address information acquired from WAN-side DHCP server 210 to DNS resolver 353, which interacts with DNS proxy service module 352 to provide DNS resolution services to network applications 252 running on the platform's secondary processing cores 150.2-150.N and/or to client devices attached thereto. In accordance with an exemplary embodiment of the invention, the secondary processing cores are configured to use the DNS proxy service module 352 of the primary core 150.1 as the DNS server for resolving domain names. DNS proxy service module 352 can have the same IP address as that of the primary processing core 150.1 or its own IP address. This IP address is provided to, or preconfigured in, the O/S network protocol stack 262 as the IP address of the DNS server to be used by the secondary core. From the perspective of each secondary processing core, proxy service module 352 appears to be an actual DNS server and as such the secondary processing cores send their DNS queries to proxy service module 352 for resolution. In actual operation however, the proxy service module 352 receives the DNS queries from the secondary cores and forwards them, via the primary core's DNS resolver 353, to WAN-side DNS servers for resolution.

Advantageously, even if the primary core 150.1 does not have full WAN connectivity with an actual WAN-side DNS server (220), the secondary cores will be able to send DNS queries to the primary core DNS proxy service without waiting for the WAN connectivity. As an additional advantage, the primary core DNS proxy service can be updated on the fly, such as by a service provider, through a renewal of the primary core IP lease initiated by the service provider's DHCP server. Because the primary core 150.1 acts as a central repository for the DNS service, the secondary cores need not take any action for the new DNS server information to be utilized.

An exemplary method of operation of the multi-core platform of FIGS. 2 and 3 will now be described in greater detail with reference to FIG. 4.

Figure 4:
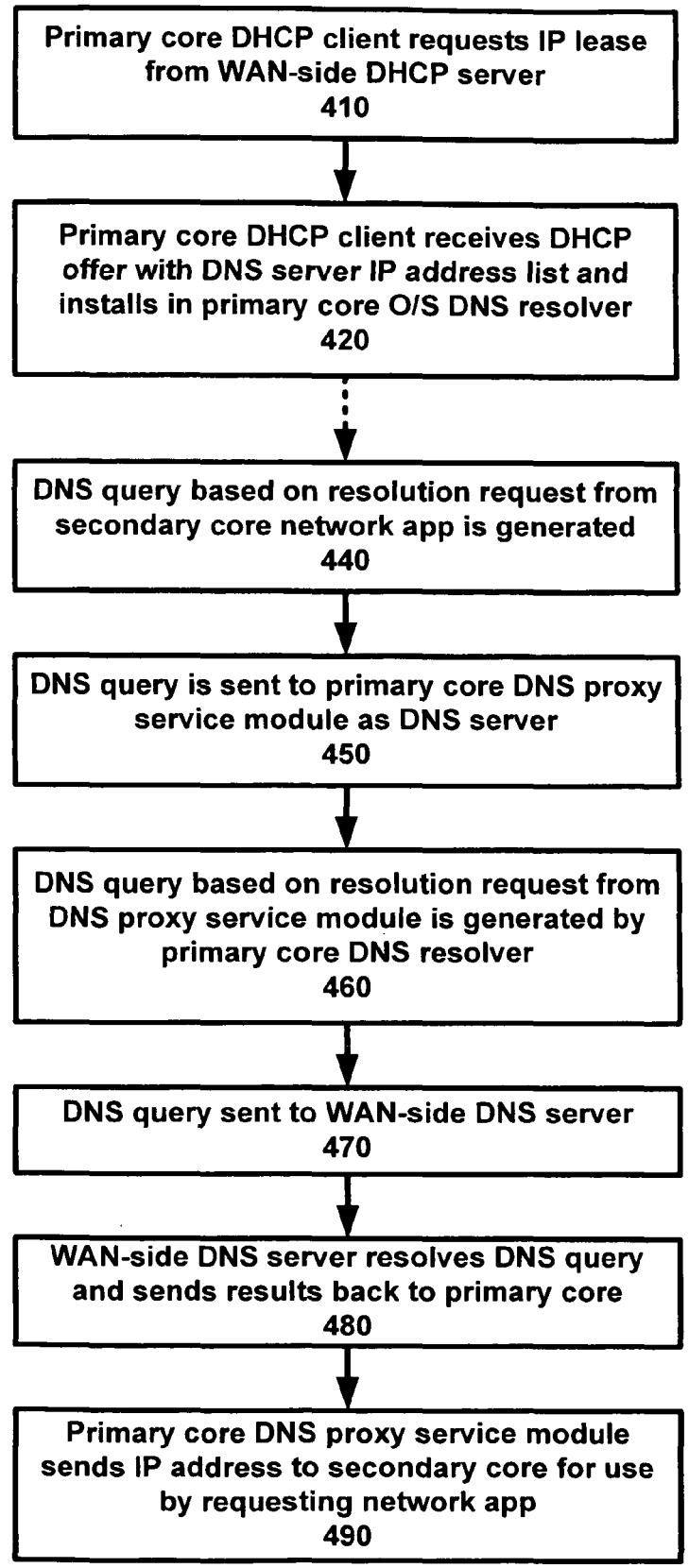
FIG. 4 is a flowchart of an exemplary method of providing DNS resolver services to network applications and clients of a secondary core via a DNS proxy service module implemented in the primary core.

As shown in FIG. 4, at step 410, DHCP client 351 sends an IP lease request to a WAN-side DHCP server (210), which, in turn, responds with a DHCP offer message containing a list of IP addresses of DNS servers (such as DNS server 220) that can be used for resolving domain names. At step 420, DHCP client 351 receives the DHCP offer message with the aforementioned DNS server IP address list and installs the list in DNS resolver 353 of the primary core's operating system.

At some later time, as represented by step 440, a network application 252 running on secondary processing core 150.2 sends a request to resolve a domain name to the operating system network protocol stack 262. An illustrative request, as shown in FIG. 3, is for the IP address corresponding to the URL "www.technicolor.com". In an exemplary embodiment, such a request is handled through a standard application programming interface (API) that uses standard operating system resources to formulate a DNS query based on the request from the network application 252.

In addition to network applications running on the secondary processing cores, network applications running on the primary core 150.1 may also require DNS resolution services. As can be appreciated, such DNS traffic can be handled in a conventional manner via the primary core's O/S network protocol stack 261, including DNS resolver 353. Additionally, client devices (such as CPE devices 280) attached to the processing cores 150 via network interfaces 180 may also required DNS resolution services. For such client devices, DNS traffic passes through the O/S network protocol stack of the processing core 150 to which the client device is attached. A client device is considered to be attached to the processing core 150 controlling the network interface 180 by which the client device connects to the platform 100. As such, for client devices attached to interface 180.2 controlled by secondary core 150.2, DNS traffic is handled in similar manner to that of network applications 252 running on secondary processing core 150.2. For client devices attached to interface 180.1 controlled by primary core 150.1, DNS traffic is handled in similar manner to that of network applications running on primary processing core 150.1.

At step 450, the DNS query formulated by the secondary core O/S network protocol stack 262 is sent via data link 160 to primary core 150.1 using the IP address of the primary core (or of the DNS proxy service module 352, if different). The DNS query is conveyed, via the primary core O/S network protocol stack 261, to DNS proxy service module 352. As mentioned above, the IP address to which the secondary core is to send DNS queries can be preconfigured into the secondary core or it can be provided to the secondary core. In an exemplary embodiment, the primary core can provide this information to each secondary core as the secondary core initializes its network software or at any other suitable time before DNS queries are sent from the secondary core at step 450.

At step 460, based on the DNS query received from secondary core 150.2, DNS proxy service module 352 sends a resolution request to the primary core O/S DNS resolver 353. In turn, DNS resolver 353 generates a DNS query based on the resolution request. Note that the DNS query generated by the DNS resolver 353 is essentially a reformulated version of the DNS query received by the DNS proxy service module 352 from the secondary core. As can be appreciated, the two versions of the DNS query will specify different DNS server IP addresses to which the query is to be sent. The second DNS query (from DNS resolver 353) can be thought of as a re-addressed version of the first DNS query (from the secondary core) on which it is based.

At step 470, the DNS query generated by DNS resolver 353 is sent out via the WAN interface to a WAN-side DNS server (e.g., 220) whose address is listed in the DNS server IP address list installed at step 420. At step 480, the WAN-side DNS server resolves the IP address and sends the result (e.g., "157.254.235.97") back to the primary core 150.1. More specifically, the resolution result is sent to DNS resolver 353 which, in turn, provides the result to DNS proxy service module 352.

Finally, at step 490, DNS proxy service module 352 provides the resultant IP address to the secondary processing core 150.2 for use by the network application 252 or client that requested it.

Although exemplary embodiments of the invention have been described using a home gateway with one primary processing core, the present invention can be applied to any multi-core platform in which one or more cores obtain DNS services via one or more other cores having direct connectivity to the network(s) in which the DNS servers reside.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, some or all of the elements may be implemented in a stored-program-controlled processor, e.g., a general purpose processor, which executes associated software, e.g., corresponding to one, or more, steps, which software may be embodied in any of a variety of suitable storage media. It is therefore to be understood that numerous modifications may be made to the illustrative embodiments and that other arrangements may be devised without departing from the spirit and scope of the present invention.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms (for example, a hardware apparatus, hardware and software apparatus, or a computer-readable media). An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device. Processing devices also include communication devices, such as, for example, computers, cell phones, portable/personal digital assistants ("PDAs"), and other devices that facilitate communication of information between end-users.

Additionally, the methods may be implemented by instructions being performed by a processor, and such instructions may be stored on a processor or computer-readable media such as, for example, an integrated circuit, a software carrier or other storage device such as, for example, a hard disk, a compact diskette, a random access memory ("RAM"), a read-only memory ("ROM") or any other magnetic, optical, or solid state media. The instructions may form an application program tangibly embodied on a computer-readable medium such as any of the media listed above. As should be clear, a processor may include, as part of the processor unit, a computer-readable media having, for example, instructions for carrying out a process. The instructions, corresponding to the method of the present invention, when executed, can transform a general purpose computer into a specific machine that performs the methods of the present invention.

The invention claimed is:

1. A method of providing Domain Name System (DNS) resolution service in a gateway having a multi-core platform comprising:
    sending a first DNS query from a secondary processing core within the gateway to a primary processing core within the gateway;
    generating a second DNS query based on the first DNS query;
    sending the second DNS query to a DNS server via a WAN interface to resolve the second DNS query;
    receiving a network address result at the primary processing core; and
    sending the network address result from the primary processing core to the secondary processing core enabling the secondary processing core to provide DNS resolution services to applications running on the secondary processing core.

2. The method of claim 1, wherein the primary processing core includes a DNS proxy service module, the DNS proxy service module receives the first DNS query from the secondary processing core and sends the network address result to the secondary processing core.

3. The method of claim 1, wherein generating the second DNS query includes re-addressing the first DNS query to the DNS server.

4. The method of claim 1 comprising generating the first DNS query from a domain name resolution request of one of a network application on the secondary processing core and a client device attached to the secondary processing core.

5. The method of claim 1 comprising receiving at the primary processing core of the multi-core platform, DNS server information relating to the DNS server and installing the DNS server information in a DNS resolver of the primary processing core.

6. The method of claim 5, wherein the DNS server information includes an Internet Protocol (IP) address of the DNS server.

7. The method of claim 5 comprising:
    sending an IP lease request from the primary core to a Dynamic Host Configuration Protocol (DHCP) server, and, in response to the IP lease request, receiving a DHCP offer including the DNS server information from the DHCP server.

8. Apparatus for providing Domain Name System (DNS) resolution service in a multi-core platform comprising:
    a DNS proxy service module in a primary processing core of the multi-core platform; and
    a DNS resolver in the primary processing core of the multi-core platform, wherein:
        the DNS proxy service module receives a first DNS query from a secondary processing core of the multi-core platform,
        the DNS resolver generates a second DNS query based on the first DNS query and sends the second DNS query to a DNS server via a wide-area network (WAN) interface to resolve the second DNS query,
        receiving a network address result to the DNS resolver of the primary processing core, and
        the DNS proxy service module sends the network address result to the secondary processing core enabling the secondary processing core to provide DNS resolution services to applications running on the secondary processing core.

9. The apparatus of claim 8, wherein the multi-core platform includes a physical interface between the primary processing core and the wide-area network (WAN).

10. The apparatus of claim 8, wherein the multi-core platform includes a physical interface between at least one of the primary and secondary processing cores and a local-area network (LAN).

11. The apparatus of claim 8, wherein the multi-core platform includes a virtual or physical data link between the primary processing core and the secondary processing core.

12. The apparatus of claim 8, wherein the first DNS query is based on a domain name resolution request of a network application on the secondary processing core or of a client device attached to the secondary processing core.

13. The apparatus of claim 8, wherein:
    the primary processing core includes a Dynamic Host Configuration Protocol (DHCP) client,
    the DHCP client receives DNS server information from a DHCP server, and
    the DHCP client installs the DNS server information in the DNS resolver.

14. The apparatus of claim 13, wherein the DHCP client sends an IP lease request to a Dynamic Host Configuration Protocol (DHCP) server and receives a DHCP offer including the DNS server information from the DHCP server.

15. The apparatus of claim 13, wherein the DNS server information includes an Internet Protocol (IP) address of the DNS server.

* * * * *